United States Patent
Kawashima

(10) Patent No.: US 7,728,085 B2
(45) Date of Patent: Jun. 1, 2010

(54) PROCESS FOR PRODUCING ETHYLENE-α-OLEFIN-POLYENE RANDOM COPOLYMER

(75) Inventor: Jun Kawashima, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 736 days.

(21) Appl. No.: 11/649,250

(22) Filed: Jan. 4, 2007

(65) Prior Publication Data

US 2007/0167586 A1 Jul. 19, 2007

(30) Foreign Application Priority Data

Jan. 18, 2006 (JP) ............... 2006-009615

(51) Int. Cl.
C08F 4/64 (2006.01)
C08F 4/649 (2006.01)
C08F 4/642 (2006.01)
C08F 4/6592 (2006.01)
C08F 236/00 (2006.01)
C08F 236/20 (2006.01)

(52) U.S. Cl. .............. 526/133; 526/160; 526/161; 526/336; 526/339

(58) Field of Classification Search .......... 526/133, 526/160, 161, 336, 339
See application file for complete search history.

(56) References Cited

U.S. PATENT DOCUMENTS

| 4,542,199 A | 9/1985 | Kaminsky et al. | |
|---|---|---|---|
| 5,519,100 A | 5/1996 | Ewen et al. | |
| 6,300,447 B1 * | 10/2001 | Johoji et al. | 526/281 |
| 6,329,478 B1 | 12/2001 | Katayama et al. | |
| 6,458,901 B1 * | 10/2002 | Yamamoto et al. | 526/113 |

FOREIGN PATENT DOCUMENTS

| JP | 58-19309 A | 2/1983 |
|---|---|---|
| JP | 3-207704 A | 9/1991 |
| JP | 8-301934 A | 11/1996 |
| JP | 9-12635 A | 1/1997 |
| JP | 9-87313 A | 3/1997 |
| JP | 9-169878 A | 6/1997 |
| WO | WO 97/03992 A1 | 2/1997 |

* cited by examiner

*Primary Examiner*—Caixia Lu
(74) *Attorney, Agent, or Firm*—Sughrue Mion, PLLC

(57) ABSTRACT

The present invention provides a process for producing an ethylene-α-olefin-unconjugated polyene random copolymer in an aliphatic hydrocarbon solvent under conditions of high-temperature and high-activity. The process comprises polymerizing at least the following components (a)-(c) in an aliphatic hydrocarbon solvent in the presence of a catalyst comprising (A) a transition metal complex having at least one cyclopentadienyl skeleton and (B) an organoaluminum compound and (C) a boron compound as co-catalysts wherein at least a part of the polyene (c) and at least a part of the boron compound (C) are previously contacted with each other before they are introduced into a polymerization reactor:

(a): ethylene
(b): an α-olefin of 3-20 carbon atoms
(c): a polyene.

9 Claims, No Drawings

PROCESS FOR PRODUCING ETHYLENE-α-OLEFIN-POLYENE RANDOM COPOLYMER

FIELD OF THE INVENTION

The present invention relates to a process for producing an ethylene-α-olefin-unconjugated polyene random copolymer. More particularly, the present invention relates to a process for producing an ethylene-α-olefin-unconjugated polyene random copolymer in an aliphatic hydrocarbon solvent under the conditions of high-temperature and high-activity.

BACKGROUND OF THE INVENTION

Ethylene-α-olefin-unconjugated diene random copolymers are widely used as automobile materials, construction materials, industrial materials, electric wire materials and the like because they are excellent in properties such as heat resistance, weathering resistance and ozone resistance, and they have been produced using vanadium catalysts. However, these catalysts suffer from the problems that catalytic efficiency (polymer production per unit vanadium catalyst) is low, a large cost is required, and further the catalytic efficiency sharply reduces at high temperatures, and hence polymerization at high temperatures is difficult and a relatively high cost is required for post-treatments.

On the other hand, recently, investigation on the production of the copolymer using a metallocene catalyst system comprising aluminoxane which is capable of performing the polymerization at high temperatures, but the metallocene catalyst system has a problem that the molecular weight of the resulting copolymer is low (JP-A-58-19309, U.S. Pat. No. 4,542,199). There is another metallocene catalyst system comprising an alkylaluminum compound and a boron compound (JP-A-3-207704, U.S. Pat. No. 5,519,100). However, the boron compound which can give a high catalytic efficiency is mostly solid, and in order to produce copolymers stably with a high catalytic efficiency, it is preferred to use an aromatic solvent in which a solid boron compound is highly soluble. In the case of using an aromatic solvent, the post-treatments require more troubles than using an aliphatic hydrocarbon solvent.

SUMMARY OF THE INVENTION

Under the circumstances, the object of the present invention is to provide a process for producing an ethylene-α-olefin-unconjugated polyene random copolymer in an aliphatic hydrocarbon solvent under the conditions of high-temperature and high-activity.

That is, the present invention relates to a process for producing an ethylene-α-olefin-unconjugated polyene random copolymer which comprises polymerizing at least the following components (a)-(c) in an aliphatic hydrocarbon solvent in the presence of a catalyst comprising (A) a transition metal complex having at least one cyclopentadienyl skeleton and (B) an aluminium compound and (C) a boron compound as co-catalysts, wherein at least a part of the polyene (c) and at least a part of the boron compound (C) are previously contacted with each other before introducing into a polymerization reactor:

(a): ethylene
(b): an α-olefin of 3-20 carbon atoms
(c): a polyene.

Preferably, whole of the polyene (c) and whole of the boron compound (C) are previously contacted with each other before introducing into the polymerization reactor.

According to the present invention, there is provided a process for producing an ethylene-α-olefin-unconjugated polyene random copolymer in an aliphatic hydrocarbon solvent under the conditions of high-temperature and high-activity.

DESCRIPTION OF THE PREFERRED EMBODIMENTS

The component (a) in the present invention is ethylene.

The component (b) in the present invention is an α-olefin of 3-20 carbon atoms. There may be used two or more α-olefins simultaneously. Examples of the α-olefin are straight chain olefins such as propylene, 1-butene, 1-pentene, 1-hexene, 1-heptene, 1-octene, 1-nonene and 1-decene, branched chain olefins such as 3-methyl-1-butene, 3-methyl-1-pentene and 4-methyl-1-pentene, and vinylcyclohexane. Propylene and 1-butene are preferred, and propylene is particularly preferred.

The polyene (c) in the present invention is not particularly limited. Straight chain unconjugated polyenes, cyclic unconjugated polyenes and conjugated polyenes can be exemplified as the polyenes. Specific examples of the polyenes are 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, 5-ethylidene-2-norbornene, 5-propylidene-2-norbornene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-pentyl-2,5-norbornadiene, 7-hexyl-2,5-norbornadiene, 7,7-dimethyl-2,5-norbornadiene, 7,7-methylethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 1,3-butadiene, isoprene, 1,3-pentadiene (piperylene), 2,3-dimethyl-1,3-butadiene, 1,3-hexadiene, etc. In addition, cyclic dienes having the following structure can also be exemplified.

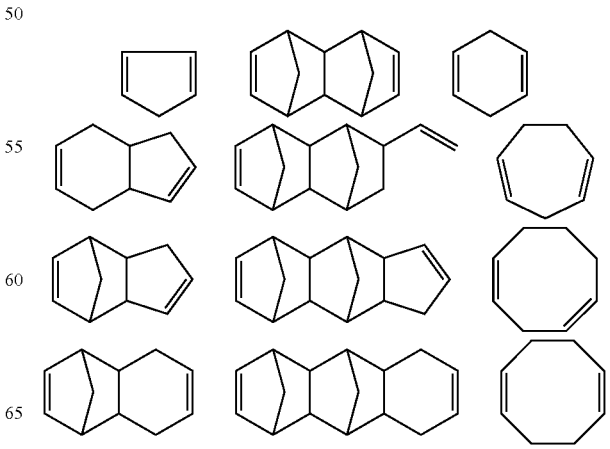

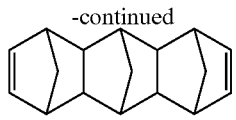

In the present invention, these polyenes can be used each alone or in combination of two or more. Among them, norbornene derivatives are more preferred.

Furthermore, the copolymers can also be produced using other olefin compounds in addition to the above components (a)-(c).

The other compounds than the components (a)-(c) include aromatic vinyl compounds, cycloolefins having one unsaturated bond, etc.

The representatives of the aromatic vinyl compounds are nuclear and/or side chain-substituted styrenes (typical examples of the substituents are lower alkyl groups, lower alkoxy groups, halogen atoms, and the like). Examples of them are styrene, α-methylstyrene, p-methylstyrene, o-chlorostyrene, p-chlorostyrene, 2,4-dimethylstyrene, t-butylstyrene, etc.

As the cycloolefins having one unsaturated bond, mention may be made of monocyclic olefins and polycyclic olefins, and polycyclic olefins are preferred from the point of reactivity. Specific examples are norbornenes and substituted norbornenes.

The monomers which may be used, if necessary, other than the above aromatic vinyl monomers and cycloolefins, include, for example, acrylic acid, alkyl acrylates (the alkyl group is preferably a chain group of about 1-6 carbon atoms) such as methyl acrylate and ethyl acrylate, methacrylic acid, alkyl methacrylates (the alkyl group is preferably a chain or cyclic group of about 1-6 carbon atoms) such as methyl methacrylate, ethyl methacrylate and cyclohexyl methacrylate, α,β-unsaturated dicarboxylic anhydrides such as maleic anhydride and itaconic anhydride, and N-substituted maleimides such as N-phenylmaleimide and N-methylmaleimide. The amount of the compounds other than the components (a)-(c) is not particularly limited and is optionally set depending on the purpose.

The process of the present invention comprises polymerizing the above-mentioned essential components (a)-(c) in an aliphatic hydrocarbon solvent in the presence of a catalyst comprising a transition metal complex having at least one cyclopentadienyl skeleton. As the above transition metal complexes, there may be used those which are disclosed in various patent publications such as JP-A-9-169878, JP-A-9-87313 (WO97/03992, U.S. Pat. No. 6,329,478), JP-A-9-12635 and JP-A-8-301934, and among them, preferred are transition metal complexes (A) represented by the following formulas [I]-[III].

The copolymers of the present invention can be most satisfactorily produced in the presence of a catalyst comprising the transition metal complex (A) and the following (B) and (C).

(A): At least one of the transition metal complexes represented by the following formulas [I]-[III]:

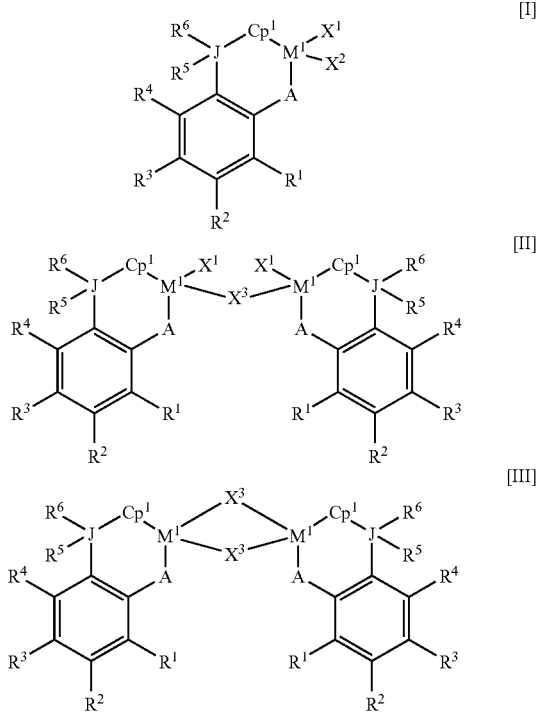

(in the above formulas [I]-[III], $M^1$ is a transition metal atom of the group 4 of the periodic table of elements, A is an atom of the group 16 of the periodic table of elements and J is an atom of the group 14 of the periodic table of elements; $Cp^1$ is a group having a cyclopentadiene anionic skeleton; and $X^1$, $X^2$, $R^1$, $R^2$, $R^3$, $R^4$, $R^5$ and $R^6$ are each independently a hydrogen atom, halogen atom, alkyl group, aralkyl group, aryl group, substituted silyl group, alkoxy group, aralkyloxy group, aryloxy group, or di-substituted amino group; $X^3$ is an atom of the group 16 of the periodic table of elements; $R^1$, $R^2$, $R^3$, $R^4$, $R^5$ and $R^6$ may optionally combine with each other to form a ring; and the two $M^1$s, As, Js, $Cp^1$s, $X^1$s, $X^2$s, $X^3$s, $R^1$s, $R^2$s, $R^3$s, $R^4$s, $R^5$s and $R^6$s may be respectively the same or different.

(B): An organoaluminum compound represented by the formula $E^1{}_a AlZ_{3-a}$ (wherein $E^1$ denotes a hydrocarbon group and all of the $E^1$s may be the same or different, Z denotes a hydrogen atom or a halogen atom and all of the Zs may be the same or different, and a is a numeral satisfying $0<a≦3$).

(C): A boron compound represented by any one of the following formulas (C1)-(C3):

(C1) a boron compound represented by the formula $BQ^1Q^2Q^3$, (C2) a boron compound represented by the formula $G^+(BQ^1Q^2Q^3Q^4)^-$, and (C3) a boron compound represented by the formula $(L-H)^+ (BQ^1Q^2Q^3Q^4)^-$.

(in the above formulas, B is a boron atom in the trivalent valence state, $Q^1$-$Q^4$ are each a halogen atom, hydrocarbon group, halogenated hydrocarbon group, substituted silyl group, alkoxy group or di-substituted amino group, which may be the same or different, $G^+$ is an inorganic or organic cation, L is a neutral Lewis base, and $(L-H)^+$ is a Brønsted acid).

The above process will be explained in more detail below.

The transition metal complex (A) will be explained. The transition metal complex (A) is represented by the formula [I], [II] or [III]. In the formula [I], [II] or [III], the transition metal atom represented by $M^1$ refers to a transition metal atom of the group 4 of the periodic table of elements (Nomenclature of Inorganic Chemistry, IUPAC, revised ed., 1989) and may be, for example, a titanium atom, zirconium atom and hafnium atom, and is preferably titanium atom or zirconium atom. The atom of the group 16 of the periodic table of elements represented by A in the formula [I], [II] or [III] may be, for example, an oxygen atom, sulfur atom and selenium atom, and is preferably an oxygen atom. The atom of the group 14 of the periodic table of elements represented by J in the formula [I], [II] or [III] may be, for example, a carbon atom, silicon atom and germanium atom, and is preferably carbon atom or silicon atom.

The group having a cyclopentadiene type anionic skeleton represented as the substituent $Cp^1$ may be, for example, $\eta^5$-(substituted)cyclopentadienyl group, $\eta^5$-(substituted)indenyl group and $\eta^5$-(substituted)fluorenyl group. Specific examples are $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group and $\eta^5$-tert-butyldimethylsilylfluorenyl group, preferred among them being, for example, the $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group.

The halogen atom in the substituents $X^1$, $X^2$, $R^1$, $R^2$, $R^3$, $R^4$, $R^5$ and $R^6$ may be, for example, a fluorine atom, chlorine atom, bromine atom and iodine atom, and is preferably chlorine atom or bromine atom, more preferably chlorine atom.

The alkyl group in the substituents $X^1$, $X^2$, $R^1$, $R^2$, $R^3$, $R^4$, $R^5$ and $R^6$ is preferably an alkyl group with the number of carbon atoms of 1-20 and may be, for example, the methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group and n-eicosyl group, more preferred among them being, the methyl group, ethyl group, isopropyl group, tert-butyl group and amyl group. All of these alkyl groups may optionally be substituted with a halogen atom, e.g., fluorine atom, chlorine atom, bromine atom and iodine atom. The alkyl group with the number of carbon atoms of 1-20 substituted with a halogen atom may be, for example, the fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group and perbromoeicosyl group. All of these alkyl groups may be partially substituted with alkoxy group, e.g., methoxy group and ethoxy group, aryloxy group, e.g., phenoxy group, or aralkyloxy group, e.g., benzyloxy group.

The aralkyl group in the substituents $X^1$, $X^2$, $R^1$, $R^2$, $R^3$, $R^4$, $R^5$ and $R^6$ is preferably an aralkyl group with the number of carbon atoms of 7-20 and may be, for example, the benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl) methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl) methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butyl-phenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group and anthracenylmethyl group, preferred of these being the benzyl group. All of these aralkyl groups may be partially substituted with halogen atom, e.g., fluorine atom, chlorine atom, bromine atom and iodine atom, alkoxy group, e.g., methoxy group and ethoxy group, aryloxy group, e.g., phenoxy group, or aralkyloxy group, e.g., benzyloxy group.

The aryl group in the substituents $X^1$, $X^2$, $R^1$, $R^2$, $R^3$, $R^4$, $R^5$ and $R^6$ is preferably an aryl group with the number of carbon atoms of 6-20 and may be, for example, the phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group and anthracenyl group, more preferred of these being the phenyl group. All of these aryl groups may be partially substituted with a halogen atom, e.g., fluorine atom, chlorine atom, bromine atom and iodine atom, alkoxy group, e.g., methoxy group and ethoxy group, aryloxy group, e.g., phenoxy group, or aralkyloxy group, e.g., benzyloxy group.

The substituted silyl group in the substituents $X^1$, $X^2$, $R^1$, $R^2$, $R^3$, $R^4$, $R^5$ and $R^6$ refers to a silyl group substituted with hydrocarbon group, and is preferably a silyl group with the number of carbon atoms of 1-20 substituted with hydrocarbon group. The hydrocarbon group may be, for example, an alkyl group with the number of carbon atoms of 1-10, such as the methyl group, ethyl group, n-propyl group, isopropyl group, n-butyl group, sec-butyl group, tert-butyl group, isobutyl group, n-pentyl group, n-hexyl group and cyclohexyl group, and an aryl group, such as phenyl group. Examples of the substituted silyl group with the number of carbon atoms of 1-20 include a monosubstituted silyl group with the number of carbon atoms of 1-20, such as the methylsilyl group, ethylsilyl group and phenylsilyl group, di-substituted silyl group with the number of carbon atoms of 2-20, such as the dimethylsilyl group, diethylsilyl group and diphenylsilyl group, and tri-substituted silyl groups with the number of carbon atoms of 3-20, such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group and triphenylsilyl group, preferred of these being the trimethylsilyl group, tert-butyldimethylsilyl group and triphenylsilyl group. The hydrocarbon groups of each of these substituted silyl groups may be partially substituted with halogen atom, e.g., fluorine atom, chlorine atom, bromine atom and iodine atom, alkoxy group, e.g., methoxy group and ethoxy group, aryloxy group, e.g., phenoxy group, or aralkyloxy group, e.g., benzyloxy group.

The alkoxy group in the substituents $X^1$, $X^2$, $R^1$, $R^2$, $R^3$, $R^4$, $R^5$ and $R^6$ is preferably an alkoxy group with the number of carbon atoms of 1-20 and may be, for example, the methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group and n-eicosoxy group, more preferred of these being the methoxy group, ethoxy group and tert-butoxy group. These alkoxy groups may each be partially substituted with halogen atom, e.g., fluorine atom, chlorine atom, bromine atom and iodine atom, alkoxy group, e.g., methoxy group and ethoxy group, aryloxy group, e.g., phenoxy group, or aralkyloxy group, e.g., benzyloxy group.

The aralkyloxy group in the substituents $X^1$, $X^2$, $R^1$, $R^2$, $R^3$, $R^4$, $R^5$ and $R^6$ is preferably an aralkyloxy group with the number of carbon atoms of 7-20 and may be, for example, the benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group and anthracenylmethoxy group, more preferred of these being the benzyloxy group. These aralkyloxy groups may each be partially substituted with halogen atom, e.g., fluorine atom, chlorine atom, bromine atom and iodine atom, alkoxy group, e.g., methoxy group and ethoxy group, aryloxy group, e.g., phenoxy group, or aralkyloxy group, e.g., benzyloxy group.

The aryloxy group in the substituents $X^1$, $X^2$, $R^1$, $R^2$, $R^3$, $R^4$, $R^5$ and $R^6$ is preferably an aryloxy group with the number of carbon atoms of 6-20 and may be, for example, the phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthyl group and anthracenoxy group. These aryloxy groups may be partially substituted with at least one halogen atom, e.g., fluorine atom, chlorine atom, bromine atom and iodine atom, alkoxy group, e.g., methoxy group and ethoxy group, aryloxy group, e.g., phenoxy group, or aralkyloxy group, e.g., benzyloxy group.

The di-substituted amino group in the substituents $X^1$, $X^2$, $R^1$, $R^2$, $R^3$, $R^4$, $R^5$ and $R^6$ refers to an amino group substituted with two hydrocarbon groups, the hydrocarbon group being, for example, an alkyl group with the number of carbon atoms of 1-10, such as the methyl group, ethyl group, n-propyl group, isopropyl group, n-butyl group, sec-butyl group, tert-butyl group, isobutyl group, n-pentyl group, n-hexyl group and cyclohexyl group, an aryl group with the number of carbon atoms of 6-10, such as the phenyl group, and an aralkyl group with the number of carbon atoms of 7-10. Examples of such di-substituted amino group substituted with a hydrocarbon group with the number of carbon atoms of 1-10 include the dimethylamino group, diethylamino group, di-n-propylamino group, diisopropylamino group, di-n-butylamino group, di-sec-butylamino group, di-tert-butylamino group, diisobutylamino group, tert-butylisopropylamino group, di-n-hexylamino group, di-n-octylamino group, di-n-decylamino group, diphenylamino group, bistrimethylsilylamino group and bis-tert-butyldimethylsilylamino group, preferred of these being the dimethylamino group and diethylamino group. These di-substituted amino groups may be partially substituted with halogen atom, e.g., fluorine atom, chlorine atom, bromine atom and iodine atom, alkoxy group, e.g., methoxy group and ethoxy group, aryloxy group, e.g., phenoxy group, or aralkyloxy group, e.g., benzyloxy group.

The substituents $R^1$, $R^2$, $R^3$, $R^4$, $R^5$ and $R^6$ may optionally combine with each other to form a ring. $R^1$ is preferably an alkyl group, aralkyl group, aryl group, or substituted silyl group. $X^1$ and $X^2$ are each preferably a halogen atom, alkyl group, aralkyl group, alkoxy group, aryloxy group and di-substituted amino group, more preferably a halogen atom and alkoxy group.

The atom of the group 16 of the periodic table of elements which is represented by $X^3$ in the formula [II] or [III] is, for example, an oxygen atom, a sulphur atom and a selenium, and preferably oxygen atom.

The transition metal complexes represented by the formula [I] include transition metal complexes wherein J in the formula [I] is a carbon atom, such as methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene-(cyclopentadienyl)(3-tert-butyl-5-chloro-2-phenoxy)titanium dichloride, methylene-(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)-titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene (tetramethylcyclopentadienyl)(3,5-dimethyl-2-phenoxy) titanium dichloride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene (trimethylsilylcyclopentadienyl)(3,5-dimethyl-2-phenoxy) titanium dichloride, isopropylidene (trimethylsilylcyclopentadienyl)(3-tert-butyl-2-phenoxy) titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy) titanium dichloride, isopropylidene (trimethylsilylcyclopentadienyl)(3-tert-butyldimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene (trimethylsilylcyclopentadienyl)(3-tert-butyl-5-methoxy-2-phenoxy)titanium dichloride, isopropylidene (trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene (fluorenyl)(3-tert-butyl-2-phenoxy)titanium dichloride, isopropylidene(fluorenyl)(3-tert-butyl-5-methyl-2-phenoxy) titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy) titanium dichloride, diphenylmethylene(cyclopentadienyl) (3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene (cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl) (3-tert-butyl-5-chloro-2-phenoxy)titanium dichloride, diphenylmethylene-(tetramethylcyclopentadienyl)(3,5-dimethyl-2-phenoxy) titanium dichloride, diphenylmethylene (tetramethylcyclopentadienyl)(3-tert-butyl-2-phenoxy) titanium dichloride, diphenylmethylene (tetramethylcyclopentadienyl)(3-tert-butyl-5-methyl-2-phenoxy)titanium dichloride, diphenylmethylene (tetramethylcyclopentadienyl)(3-phenyl-2-phenoxy) titanium dichloride, diphenylmethylene (tetramethylcyclopentadienyl)(3-tert-butyldimethylsilyl-5-methyl-2-phenoxy)titanium dichloride, diphenylmethylene (tetramethylcyclopentadienyl)(3-trimethylsilyl-5-methyl-2-phenoxy)titanium dichloride, diphenylmethylene (tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene (trimethylsilylcyclopentadienyl)(3-tert-butyl-2-phenoxy) titanium dichloride, diphenylmethylene (trimethylsilylcyclopentadienyl)(3-tert-butyl-5-methyl-2-phenoxy)titanium dichloride, diphenylmethylene (trimethylsilylcyclopentadienyl)(3-phenyl-2-phenoxy) titanium dichloride, diphenylmethylene (trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl) (3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl) (3-tert-butyl-5-methoxy-2-phenoxy)titanium dichloride and diphenylmethylene(fluorenyl)(3-tert-butyl-5-chloro-2-phenoxy)titanium dichloride; compounds resulting from changing the "titanium" in the above-mentioned compounds to zirconium or hafnium, compounds resulting from changing the "dichloride" in the above-mentioned compounds to dibromide, diiodide, bis(dimethylamide), bis(diethylamide), di-n-butoxide or diisopropoxide, compounds resulting from changing the "(cyclopentadienyl)" in the above-mentioned compounds to (dimethylcyclopentadienyl), (trimethylcyclopentadienyl), (n-butylcyclopentadienyl), (tert-butyldimethylsilylcyclopentadienyl) or (indenyl); compounds resulting from changing the "3,5-dimethyl-2-phenoxy" in the above-mentioned compounds to 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy or 3-trimethylsilyl-2-phenoxy and compounds resulting from changing the "methylene" in the above-mentioned compounds to diethylethylene; and transition metal complexes wherein J in the formula [I] is an atom of the group 14 of the periodic table of elements other than carbon atom, such as dimethylsilyl(cyclopentadienyl)(2-phenoxy)titanium dichloride, dimethylsilyl(cyclopentadienyl)(3-methyl-2-phenoxy)titanium dichloride, dimethylsilyl(cyclopentadienyl)(3,5-dimethyl-2-phenoxy) titanium dichloride, dimethylsilyl(cyclopentadienyl)(3-tert-butyl-2-phenoxy)titanium dichloride, dimethylsilyl (cyclopentadienyl)(3-tert-butyl-5-methyl-2-phenoxy) titanium dichloride, dimethylsilyl(cyclopentadienyl)(3,5-di-tert-butyl-2-phenoxy)titanium dichloride, dimethylsilyl (cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl) (3-tert-butyl-5-methoxy-2-phenoxy)titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy)titanium dichloride, dimethylsilyl(methylcyclopentadienyl)(2-phenoxy)titanium dichloride, dimethylsilyl(methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl(methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl) (5-methyl-3-phenyl-2-phenoxy)titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl (methylcyclopentadienyl)(3-tert-butyl-5-chloro-2-phenoxy) titanium dichloride, dimethylsilyl(methylcyclopentadienyl) (3,5-diamyl-2-phenoxy)titanium dichloride, dimethylsilyl (n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy) titanium dichloride, dimethylsilyl(n-butylcyclopentadienyl) (3-tert-butyl-5-methyl-2-phenoxy)titanium dichloride, dimethylsilyl(n-butylcyclopentadienyl)(3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl) (3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy)titanium dichloride, dimethylsilyl(tert-butylcyclopentadienyl)(3,5-di-tert-butyl-2-phenoxy) titanium dichloride, dimethylsilyl(tert-butylcyclopentadienyl)(5-methyl-3-phenyl-2-phenoxy) titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy) titanium dichloride, dimethylsilyl(tert-butylcyclopentadienyl)(3-tert-butyl-5-chloro-2-phenoxy) titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl(tetra-methylcyclopentadienyl)(3-methyl-2-phenoxy) titanium dichloride, dimethylsilyl (tetramethylcyclopentadienyl)(3,5-dimethyl-2-phenoxy) titanium dichloride, dimethylsilyl (tetramethylcyclopentadienyl)(3-tert-butyl-2-phenoxy) titanium dichloride, dimethylsilyl (tetramethylcyclopentadienyl)(3-tert-butyl-5-methyl-2-phenoxy)titanium dichloride, dimethylsilyl (tetramethylcyclopentadienyl)(3,5-di-tert-butyl-2-phenoxy) titanium dichloride, dimethylsilyl(tetramethylcyclopentadienyl)(5-methyl-3-phenyl-2-phenoxy)titanium dichloride, dimethylsilyl(tetramethylcyclopentadienyl)(3-tert-butyldimethylsilyl-5-methyl-2-phenoxy)titanium dichloride, dimethylsilyl(tetramethylcyclopentadienyl)(5-methyl-3-trimethylsilyl-2-phenoxy)titanium dichloride, dimethylsilyl(tetramethylcyclopentadienyl)(3-tert-butyl-5-methoxy-2-phenoxy)titanium dichloride, dimethylsilyl(tetramethylcyclopentadienyl)(3-tert-butyl-5-chloro-2-phenoxy)titanium dichloride, dimethylsilyl (tetramethylcyclopentadienyl)(3,5-diamyl-2-phenoxy) titanium dichloride, dimethylsilyl (trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl(trimethylsilylcyclopentadienyl)(3,5-dimethyl-2-phenoxy)titanium dichloride, dimethylsilyl (trimethylsilylcyclopentadienyl)(3-tert-butyl-2-phenoxy) titanium dichloride, dimethylsilyl (trimethylsilylcyclopentadienyl)(3-tert-butyl-5-methyl-2-phenoxy)titanium dichloride, dimethylsilyl (trimethylsilylcyclopentadienyl)(3,5-di-tert-butyl-2-phenoxy)titanium dichloride, dimethylsilyl (trimethylsilylcyclopentadienyl)(5-methyl-3-phenyl-2-phenoxy)titanium dichloride, dimethylsilyl (trimethylsilylcyclopentadienyl)(3-tert-butyldimethylsilyl-5-methyl-2-phenoxy)titanium dichloride, dimethylsilyl (trimethylsilylcyclopentadienyl)(5-methyl-3-trimethylsilyl-2-phenoxy)titanium dichloride, dimethylsilyl (trimethylsilylcyclopentadienyl)(3-tert-butyl-5-methoxy-2- phenoxy)titanium dichloride, dimethylsilyl(trimethylsilylcyclopentadienyl)(3-tert-butyl-5-chloro-2-phenoxy)titanium dichloride, dimethylsilyl(trimethylsilylcyclopentadienyl)(3,5-diamyl-2-phenoxy)titanium dichloride, dimethylsilyl(indenyl)(2-phenoxy)titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl(indenyl)(3-tert-butyl-2-phenoxy)titanium dichloride, dimethylsilyl(indenyl)(3-tert-butyl-5-methyl-2-phenoxy)titanium dichloride, dimethylsilyl(indenyl)(3,5-di-tert-butyl-2-phenoxy)titanium dichloride, dimethylsilyl(indenyl)(5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy)titanium dichloride, dimethylsilyl(indenyl)(3-tert-butyl-5-chloro-2-phenoxy)titanium dichloride, dimethylsilyl(indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl(fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride and dimethylsilyl(tetramethyl-cyclopentadienyl)(1-naphthoxy-2-yl)titanium dichloride; and compounds resulting from changing, in the above-mentioned compounds, "(cyclopentadienyl)" to (dimethylcyclopentadienyl), (trimethylcyclopentadienyl), (ethylcyclopentadienyl), (n-propylcyclopentadienyl), (isopropylcyclopentadienyl), (sec-butyl-cyclopentadienyl), (isobutylcyclopentadienyl), (tert-butyldimethylsilylcyclopentadienyl), (phenylcyclopentadienyl), (methylindenyl) or (phenylindenyl), compounds resulting from changing, in the above-mentioned compounds, "2-phenoxy" to 3-phenyl-2-phenoxy, 3-trimethylsilyl-2-phenoxy or 3-tert-butyldimethylsilyl-2-phenoxy, compounds resulting from changing, in the above-mentioned compounds, "dimethylsilyl" to diethylsilyl, diphenylsilyl or dimethoxysilyl, compounds resulting from changing, in the above-mentioned compounds, "titanium" to zirconium or hafnium, and compounds resulting from changing, in the above-mentioned compounds, "dichloride" to dibromide, diiodide, bis(dimethylamide), bis(diethylamide), di-n-butoxide or diisopropoxide.

The transition metal complexes represented by the formula [II] include, for example, μ-oxobis{isopropylidene(cyclopentadienyl)(2-phenoxy)titanium chloride}, μ-oxobis{isopropylidene(cyclopentadienyl)(2-phenoxy)titanium methoxide}, μ-oxobis{isopropylidene(cyclopentadienyl)(3-tert-butyl-5-methyl-2-phenoxy)titanium chloride}, μ-oxobis{isopropylidene(cyclopentadienyl)(3-tert-butyl-5-methyl-2-phenoxy)titanium methoxide}, μ-oxobis{isopropylidene(methylcyclopentadienyl)(2-phenoxy)titanium chloride}, μ-oxobis{isopropylidene(methylcyclopentadienyl)(2-phenoxy)titanium methoxide}, α-oxobis{isopropylidene(methylcyclopentadienyl)(3-tert-butyl-5-methyl-2-phenoxy)titanium chloride}, μ-oxobis{isopropylidene(methylcyclopentadienyl)(3-tert-butyl-5-methyl-2-phenoxy)titanium methoxide}, μ-oxobis{isopropylidene(tetramethylcyclopentadienyl)(2-phenoxy)titanium chloride}, μ-oxobis{isopropylidene(tetramethylcyclopentadienyl)(2-phenoxy)titanium methoxide}, μ-oxobis{isopropylidene(tetramethylcyclopentadienyl)(3-tert-butyl-5-methyl-2-phenoxy)titanium chloride}, μ-oxobis{isopropylidene(tetramethylcyclopentadienyl)(3-tert-butyl-5-methyl-2-phenoxy)titanium methoxide}, μ-oxobis{dimethylsilylene(cyclopentadienyl)(2-phenoxy)titanium chloride}, μ-oxobis{dimethylsilylene(cyclopentadienyl)(2-phenoxy)titanium methoxide}, μ-oxobis{dimethylsilylene(cyclopentadienyl)(3-tert-butyl-5-methyl-2-phenoxy)titanium chloride}, μ-oxobis{dimethylsilylene(cyclopentadienyl)(3-tert-butyl-5-methyl-2-phenoxy)titanium methoxide}, μ-oxobis{dimethylsilylene(methylcyclopentadienyl)(2-phenoxy)titanium chloride}, μ-oxobis{dimethylsilylene(methylcyclopentadienyl)(2-phenoxy)titanium methoxide}, μ-oxobis{dimethylsilylene(methylcyclopentadienyl)(3-tert-butyl-5-methyl-2-phenoxy)titanium chloride}, μ-oxobis{dimethylsilylene(methylcyclopentadienyl)(3-tert-butyl-5-methyl-2-phenoxy)titanium methoxide}, μ-oxobis{dimethylsilylene(tetramethylcyclopentadienyl)(2-phenoxy)titanium chloride}, μ-oxobis{dimethylsilylene(tetramethyl-cyclopentadienyl)(2-phenoxy)titanium methoxide}, μ-oxobis{dimethylsilylene(tetramethylcyclopentadienyl)(3-tert-butyl-5-methyl-2-phenoxy)titanium chloride}, μ-oxobis{dimethylsilylene(tetramethylcyclopentadienyl)(3-tert-butyl-5-methyl-2-phenoxy)titanium methoxide}, etc.

The transition metal complexes represented by the formula [III] include, for example, di-μ-oxobis{isopropylidene(cyclopentadienyl)(2-phenoxy)titanium}, di-μ-oxobis{isopropylidene(cyclopentadienyl)(3-tert-butyl-5-methyl-2-phenoxy)titanium}, di-μ-oxobis{isopropylidene(methylcyclopentadienyl)(2-phenoxy)titanium}, di-μ-oxobis{isopropylidene(methylcyclopentadienyl)(3-tert-butyl-5-methyl-2-phenoxy)titanium}, di-μ-oxobis{isopropylidene(tetramethylcyclopentadienyl)(2-phenoxy)titanium}, di-μ-oxobis{isopropylidene(tetramethylcyclopentadienyl)(3-tert-butyl-5-methyl-2-phenoxy)titanium}, di-μ-oxobis{dimethylsilylene(cyclopentadienyl)(2-phenoxy)titanium}, di-μ-oxobis{dimethylsilylene(cyclopentadienyl)(3-tert-butyl-5-methyl-2-phenoxy)titanium}, di-μ-oxobis{dimethylsilylene(methylcyclopentadienyl)(2-phenoxy)titanium}, di-μ-oxobis{dimethylsilylene(methylcyclopentadienyl)(3-tert-butyl-5-methyl-2-phenoxy)titanium}, di-μ-oxobis{dimethylsilylene(tetramethylcyclopentadienyl)(2-phenoxy)titanium}, di-μ-oxobis{dimethylsilylene(tetramethylcyclopentadienyl)(3-tert-butyl-5-methyl-2-phenoxy)titanium}, etc.

The transition metal complexes represented by the formula [I] can be produced by the process disclosed, for example, in JP-A-9-87313 (WO97/03992, U.S. Pat. No. 6,329,478). The transition metal complexes represented by the formula [II] or [III] can be produced by reacting the transition metal complexes represented by the formula [I] with water in an amount of 1 or 2 equivalents.

The aluminium compound (B) will be explained. The aluminium compound (B) is an aluminium compound represented by the following formula.

(B) Organoaluminum compound represented by the formula $E^1{}_a AlZ_{3-a}$ (wherein $E^1$ denotes a hydrocarbon group and all $E^1$s may be the same or different, Z denotes a hydrogen atom or a halogen atom and all Zs may be the same or different, and a is a numeral satisfying 0<a≦3).

The hydrocarbon group of $E^1$ is preferably a hydrocarbon group of 1-8 carbon atoms of 1-8, and more preferably an alkyl group.

Specific examples of the organoaluminum compound (B) represented by the formula $E^1{}_aAlZ_{3-a}$ include trialkylaluminums, such as trimethylaluminum, triethylaluminum, tripropylaluminum, triisobutylaluminum, and trihexylaluminum; dialkylaluminum chlorides, such as dimethylaluminum chloride, diethylaluminum chloride, dipropylaluminum chloride, diisobutylaluminum chloride, and dihexylaluminum chloride; alkylaluminum dichlorides such as methylaluminum dichloride, ethylaluminum dichloride, propylaluminum dichloride, isobutylaluminum dichloride, and hexylaluminum dichloride; and dialkylaluminum hydrides, such as dimethylaluminum hydride, diethylaluminum hydride, dipropylaluminum hydride, diisobutylaluminum hydride and dihexylaluminum hydride. Preferred of these is a trialkylaluminum, more preferred being triethylaluminum or triisobutylaluminum.

The boron compound (C) will be explained. As the boron compound (C), there may be used any one of the boron compounds (C1) represented by the formula $BQ^1Q^2Q^3$, the boron compounds (C2) represented by the formula $G^+(BQ^1Q^2Q^3Q^4)^-$, and the boron compounds (C3) represented by the formula $(L-H)^+(BQ^1Q^2Q^3Q^4)^-$.

In the boron compounds (C1) represented by the formula $BQ^1Q^2Q^3$, B is a boron atom in the trivalent valence state, $Q^1$-$Q^3$ are each a halogen atom, hydrocarbon group, halogenated hydrocarbon group, substituted silyl group, alkoxy group or di-substituted amino group, which may be the same or different. $Q^1$-$Q^3$ are preferably a halogen atom, hydrocarbon group containing 1-20 carbon atoms, halogenated hydrocarbon group containing 1-20 carbon atoms, substituted silyl group containing 1-20 carbon atoms, alkoxy group containing 1-20 carbon atoms or amino group containing 2-20 carbon atoms, more preferably a halogen atom, hydrocarbon group containing 1-20 carbon atoms or halogenated hydrocarbon group containing 1-20 carbon atoms. Further preferably, $Q^1$-$Q^3$ are each a fluorinated hydrocarbon group of 1-20 carbon atoms containing at least one fluorine atom, and especially preferably, $Q^1$-$Q^3$ are each a fluorinated aryl group of 6-20 carbon atoms containing at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane and phenylbis(pentafluorophenyl)borane, most preferred of these being tris(pentafluorophenyl)borane.

In the boron compound (C2) represented by the formula $G^+(BQ^1Q^2Q^3Q^4)^-$, $G^+$ is an inorganic or organic cation, B is a boron atom in the trivalent valence state, and $Q^1$-$Q^4$ are the same as defined for $Q^1$-$Q^3$ in the above-mentioned compound (C1).

Examples of $G^+$ which is the inorganic cation in the compound represented by the formula $G^+(BQ^1Q^2Q^3Q^4)^-$ are ferrocenium cations, alkyl-substituted ferrocenium cations and silver cations, and examples of $G^+$ which is the organic cation are triphenylmethyl cations. $G^+$ is preferably a carbenium cation, particularly preferably triphenylmethyl cation. Examples of $(BQ^1Q^2Q^3Q^4)^-$ are tetrakis(pentafluorophenyl) borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate and tetrakis(3,5-bistrifluoromethylphenyl)borate.

Examples of the specific combination of these include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis (pentafluorophenyl)borate and triphenylmethyl tetrakis(3,5-bistrifluoromethylphenyl)borate, most preferred of these being triphenylmethyl tetrakis(pentafluorophenyl)borate. In the boron compound (C3) represented by the formula $(L-H)^+(BQ^1Q^2Q^3Q^4)^-$, L is a neutral Lewis base, $(L-H)^-$ is a Brønsted acid, B is a boron atom in the trivalent valence state, and $Q_1$-$Q_4$ are the same as defined for $Q^1$-$Q^3$ in the above-mentioned Lewis acid (C1).

In the compound represented by the formula $(L-H)^+(BQ^1Q^2Q^3Q^4)^-$, $(L-H)^+$ of the Brønsted acid is, for example, a trialkyl-substituted ammonium, N,N-dialkylanilinium, dialkylammonium and triarylphosphonium, and the $(BQ^1Q^2Q^3Q^4)^-$ may be, for example, the same as those described above.

Examples of the specific combination of these include triethylammonium tetrakis(pentafluorophenyl)borate, tripropylammonium tetrakis(pentafluorophenyl)borate, tri(normal butyl)ammonium tetrakis(pentafluorophenyl)borate, tri(normal butyl)ammonium tetrakis(3,5-bistrifluoromethylphenyl) borate, N,N-dimethylanilinium tetrakis(pentafluorophenyl) borate, N,N-diethylanilinium tetrakis(pentafluorophenyl) borate, N,N-2,4,6-pentamethylanilinium tetrakis (pentafluorophenyl)borate, N,N-dimethylanilinium tetrakis (3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri (methylphenyl)phosphonium tetrakis(pentafluorophenyl)borate, and tri(dimethylphenyl)phosphonium tetrakis(pentafluorophenyl)borate, most preferred of these being tri (normal butyl)ammonium tetrakis(pentafluorophenyl)borate or N,N-dimethylanilinium tetrakis(pentafluorophenyl)borate.

Among (C1), (C2) and (C3), the compound of (C3) is preferred, and N,N-dimethylanilinium tetrakis(pentafluorophenyl)borate is most preferred.

In the process of the present invention, a high activity is developed by previously contacting the boron compound (C) and the polyene (c) with each other before they are introduced into a polymerization reactor. The time for which the boron compound (C) and the polyene (c) are previously contacted is optionally selected, and preferably 60 minutes or less, especially preferably 3 minutes or less. If the contacting time is too long, a side reaction proceeds between the boron compound (C) and the polyene (c), and the high activity may not be developed. The lower limit of the contacting time is usually 10 seconds, preferably, 30 seconds.

The temperature at which the boron compound (C) and the polyene (c) are previously contacted is also important. The temperature can be in the range of −50 to 250° C., which is the same as the polymerization temperature, and the temperature is preferably 0 to 80° C., especially preferably 20 to 40° C. If the contacting temperature is too high, a side reaction proceeds between the boron compound (C) and the polyene (c), and the high activity may not be developed.

The contacting of the polyene and the boron compound may be carried out for example by adding the boron compound (C) which is solid to the polyene (c) which is liquid. If necessary, the boron compound (C) may be pulverized. In order to inhibit the excess proceeding of the side reaction, stirring is usually unnecessary, but if necessary they may be stirred.

When each of the components is used in the state of solution or in the state of being suspended in a solvent, the concentration is optionally selected depending on the conditions such as performance of apparatus used for feeding each component to the polymerization reactor, and generally the concentration of (A) is usually 0.01-500 μmol/g, more preferably 0.05-100 μmol/g, further preferably 0.05-50 μmol/g, that of (B) is usually 0.01-10000 μmol/g, more preferably 0.1-5000 μmol/g, further preferably 0.1-2000 μmol/g in terms of Al atom, and that of (C) is usually 0.01-500 μmol/g, more preferably 0.05-200 μmol/g, further preferably 0.05-100 μmol/g.

In the process of the present invention, there may be employed, for example, solution polymerization or slurry polymerization wherein aliphatic hydrocarbons, such as butane, pentane, hexane, heptane and octane are used as the solvent, and, further, the polymerization may be conducted either continuously or batch-wise. The polymerization temperature is usually −50° C. or more, preferably −20° C. or more, more preferably 65° C. or more, further preferably 80° C. or more, and usually 250° C. or less, preferably 200° C. or less, more preferably 85° C. or less. The polymerization pressure is preferably from normal pressure to 100 kg/cm$^2$G. The polymerization time, in general, is determined according to the kind of the catalyst used and the reaction apparatus, and may be in the range from 1 minute to 20 hours. Furthermore, chain transfer agents, such as hydrogen, may be added to control the molecular weight of the polymer.

The polymerization method for carrying out the present invention is preferably solution polymerization using aliphatic hydrocarbons, such as hexane, heptane and octane as a solvent. The polymerization may be conducted either continuously or batch-wise. The substantial part of the present invention can be attained only by carrying out the polymerization using one polymerization reactor, but the polymerization may also be carried out using two or more reactors connected in series or parallel. Specifically, it is preferred that the polymerization meets the following conditions (I)-(IV).

(I) The polymerization method is solution polymerization.

(II) The polymerization temperature is 0-200° C.

(III) The residence time is 5-120 minutes.

(IV) The pressure in the polymerization reactor is in the range of normal pressure to 100 kg/cm$^2$G.

More preferably, the copolymer can be efficiently produced using a reactor for producing copolymer by low-temperature and low-pressure solution polymerization method in which a polymerization is carried out using a solvent such as hexane under the conditions of a temperature of 30° C. or higher and 160° C. or lower at which the polymer is dissolved and a polymerization pressure of 0 kg/cm$^2$ G or higher and 50 kg/cm$^2$G or lower.

The molar ratio of the unit originating from ethylene/the unit originating from α-olefin in the copolymer of the present invention is 95/5-20/80, preferably 90/10-40/60, particularly preferably 85/15-50/50. If the molar ratio is too high, the copolymer tends to become resinous, and if it is too low, the copolymer tends to be insufficient in strength.

The iodine value of the copolymer of the present invention is 0-50 (g/100 g polymer), preferably 1-40, and more preferably 3-35. If the iodine value is too low, vulcanization sometimes becomes difficult, and if it is too high, the copolymer is sometimes inferior in weathering resistance.

EXAMPLE

The present invention will be explained in more detail by the following examples and comparative examples, which should not be construed as limiting the invention in any manner.

[I] Method for Preparation of Catalyst:

The catalyst component was prepared in accordance with the method disclosed in JP-A-9-87313 (WO97/03992, U.S. Pat. No. 6,329,478).

Comparative Example 1

Copolymerization of ethylene, propylene and 5-ethylidene-2-norbornene was conducted using a 1.5 L SUS polymerization reactor provided with an agitating blade. That is, 0.8 L of hexane as a polymerization solvent was charged in the polymerization reactor. On the other hand, 22 g of ethylene and 27.3 g of propylene as monomers were introduced from the top of the polymerization reactor, and the internal temperature of the reaction reactor was adjusted to 80° C. by water bath, followed by adding 40 mmol of 5-ethylidene-2-norbornene (ENB). Thereafter, 0.5 mmol of triisobutylaluminum (TIBA) was added, then 0.001 mmol of dimethylsilyl(tetramethylcyclopentadienyl)(3-tert-butyl-5-methyl-2-phenoxy)titanium dichloride was added, and finally 0.004 mmol of N,N-dimethylanilinium tetrakis(pentafluorophenyl) borate was added, and polymerization was started. After the polymerization temperature converged on the polymerization starting temperature, 10 ml of methanol containing 0.1 g of BHT was added to terminate the polymerization. The polymer solution after the polymerization was concentrated, and the copolymer was recovered by methanol precipitation method, followed by vacuum drying at 80° C. for 12 hours, thereby obtaining 63.1 g of a copolymer (63.1 kg per 1 mmol of the Ti catalyst). Control was made so that ethylene was supplied in an amount corresponding to the amount of the monomer consumed during the polymerization in the polymerization reactor. The results are shown in Table 1.

Example 1

A procedure was carried out in the same manner as in Comparative Example 1, except that ENB and N,N-dimethylanilinium tetrakis(pentafluorophenyl)borate were contacted with each other at room temperature (25° C.) for 1 minute before they were introduced into the polymerization reactor. 127.9 g of a copolymer (128 kg per 1 mmol of the Ti catalyst) was obtained. The results are shown in Table 1.

Example 2

A procedure was carried out in the same manner as in Comparative Example 1, except that ENB and N,N-dimethylanilinium tetrakis(pentafluorophenyl)borate were contacted with each other at room temperature (25° C.) for 60 minutes before they were introduced into the polymerization reactor. 92.8 g of a copolymer (93 kg per 1 mmol of the Ti catalyst) was obtained. The results are shown in Table 1.

TABLE 1

|  | | Comparative Example 1 | Example 1 | Example 2 |
|---|---|---|---|---|
| Previous contacting time | minute | 0 | 1 | 60 |
| Polymerization temperature | °C. | 80 | 80 | 80 |
| Amount of ethylene charged | g | 22 | 22 | 22 |
| Amount of propylene charged | g | 27.3 | 27.3 | 27.3 |
| Amount of ENB added (*1) | mmol | 40 | 40 | 40 |
| Amount of Ti compound added (*2) | mmol | 0.001 | 0.001 | 0.001 |
| Amount of borate Compound added (*3) | mmol | 0.004 | 0.004 | 0.004 |
| Amount of TIBA added (*4) | mmol | 0.5 | 0.5 | 0.5 |
| Catalytic efficiency (per 1 mmol of Ti catalyst) | kg | 63 | 128 | 93 |

(*1) ENB: 5-ethylidene-2-norbornene
(*2) Ti compound: 2-dimethylsilyl(tetramethylcyclo-pentadienyl) (3-tert-butyl-5-methyl-2-phenoxy)titanium dichloride
(*3) Borate compound: N,N-dimethylanilinium tetrakis-(pentafluorophenyl)borate
(*4) TIBA: triisobutylaluminum

The invention claimed is:

1. A process for producing an ethylene-α-olefin-polyene random copolymer which comprises polymerizing at least the following components (a)-(c) in an aliphatic hydrocarbon solvent in the presence of a catalyst comprising (A) a transition metal complex having at least one cyclopentadienyl skeleton and (B) an organoaluminum compound and (C) a boron compound as co-catalysts wherein at least a part of the polyene (c) and at least a part of the boron compound (C) are previously contacted with each other before introducing into a polymerization reactor:

(a): ethylene
(b): an α-olefin of 3-20 carbon atoms
(c): a polyene.

2. The process for producing a copolymer according to claim 1, wherein the transition metal complex is at least one of the transition metal complexes represented by the following formulas [I]-[III]:

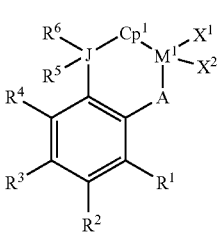

[I]

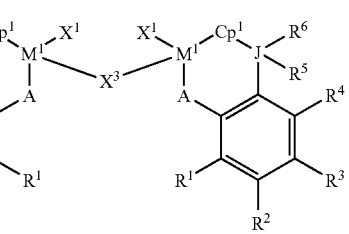

[II]

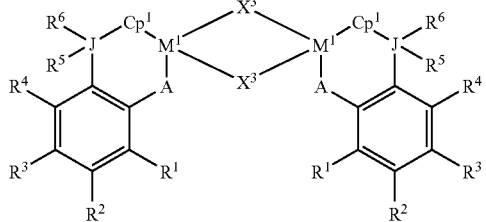

[III]

in the above formulas [I]-[III], $M^1$ is a transition metal atom of the group 4 of the periodic table of elements, A is an atom of the group 16 of the periodic table of elements and J is an atom of the group 14 of the periodic table of elements; $Cp^1$ is a group having a cyclopentadiene anionic skeleton; $X^1$, $X^2$, $R^1$, $R^2$, $R^3$, $R^4$, $R^5$ and $R^6$ are each independently a hydrogen atom, halogen atom, alkyl group, aralkyl group, aryl group, substituted silyl group, alkoxy group, aralkyloxy group, aryloxy group, or di-substituted amino group; $X^3$ is an atom of the group 16 of the periodic table of elements; $R^1$, $R^2$, $R^3$, $R^4$, $R^5$ and $R^6$ may optionally combine with each other to form a ring; and the two $M^1$s, As, Js, $Cp^1$s, $X^1$s, $X^2$s, $X^3$s, $R^1$s, $R^2$s, $R^3$s, $R^4$ s, $R^5$s and $R^6$s may be respectively the same or different.

3. The process for producing a copolymer according to claim 1 which comprises polymerizing the components (a)-(c) of claim 1 in the presence of a catalyst comprising the transition metal complex (A) of claim 2 and the following (B) and (C):

(B): an organoaluminum compound represented by the formula $E^1{}_a AlZ_{3-a}$, wherein $E^1$ denotes a hydrocarbon group and all of $E^1$s may be the same or different, Z denotes a hydrogen atom or halogen atom and all of Zs may be the same or different, and a is a numeral satisfying $0 < a \leq 3$, and (C): a boron compound of one of the following (C1)-(C3):
(C1) a boron compound represented by the formula $BQ^1Q^2Q^3$,
(C2) a boron compound represented by the formula $G^+(BQ^1Q^2Q^3Q^4)^-$, and
(C3) a boron compound represented by the formula $(L-H)^+ (BQ^1Q^2Q^3Q^4)^-$, in the above formulas, B is a boron atom in the trivalent valence state, $Q^1$-$Q^4$ are each a halogen atom, hydrocarbon group, halogenated hydrocarbon group, substituted silyl group, alkoxy group or di-substituted amino group, which may be the same or different, $G^+$ is an inorganic or organic cation, L is a neutral Lewis base, and $(L-H)^+$ is a Brønsted acid.

4. The process for producing a copolymer according to claim 1, wherein the polyene (c) is 5-ethylidene-2-norbornene.

5. The process for producing a copolymer according to claim 1, wherein the boron compound (C) in claim 3 is N,N-dimethylanilinium tetrakis(pentafluorophenyl)borate.

6. The process for producing a copolymer according to claim 1, wherein the boron compound (C) and the polyene (c) are contacted with each other for 60 minutes or less before they are introduced into the polymerization reactor.

7. The process for producing a copolymer according to claim 6, wherein the boron compound (C) and the polyene (c) are contacted with each other for 3 minutes or less before they are introduced into the polymerization reactor.

8. The process for producing a copolymer according to claim 1, wherein the polymerization temperature is −50-250° C.

9. The process for producing a copolymer according to claim 1, wherein whole of the polyene (c) and whole of the boron compound (C) are previously contacted with each other before introducing into the polymerization reactor.

* * * * *